United States Patent

Shirasu et al.

[11] 3,967,071
[45] June 29, 1976

[54] SWITCHING SYSTEM OF STORED PROGRAM CONTROL TYPE

[75] Inventors: Hirotoshi Shirasu; Hirotaka Usuda, both of Yokohama, Japan

[73] Assignee: Hitachi, Ltd., Japan

[22] Filed: May 28, 1974

[21] Appl. No.: 474,024

[30] Foreign Application Priority Data
May 28, 1973 Japan.............................. 48-58694

[52] U.S. Cl........................ 179/18 ES; 179/18 AB; 179/18 FF
[51] Int. Cl.² .......................................... H04Q 3/54
[58] Field of Search........ 179/18 ES, 18 FF, 18 AB, 179/18 FG

[56] References Cited
UNITED STATES PATENTS
3,553,384  1/1971  Lucas et al..................... 179/18 ES
3,830,983  8/1974  Eddy et al..................... 179/18 FS Primary Examiner—Thomas W. Brown
Attorney, Agent, or Firm—Craig & Antonelli

[57] ABSTRACT

A telephone switching system of the stored program control type comprising a calling line identifier for identifying the position of a calling subscriber on the switching network and a called line busy status detector for detecting the free or busy status of a called line designated by a central controller. The central controller reads and utilizes the information identified and detected by the above-mentioned two devices respectively, thereby to eliminate the need for memories in the central controller to store the status of all subscribers' lines.

7 Claims, 4 Drawing Figures

SWITCHING SYSTEM OF STORED PROGRAM CONTROL TYPE

The present invention relates to an automatic telephone switching system of the common control type, in particular to an automatic switching system of the stored program control type.

The switching system of the stored program control type has been developed and put into service in recent years. Generally, the switching system of the stored program control type comprises a speech path system and a central controlling system. The speech path system includes those sections concerned with the connection of speech and the central controlling system with those sections concerned with controlling of the connections.

The primary feature of the switching system of stored program control type resides in the fact that the speech path system is controlled by the central controlling system in accordance with instructions called a program which is stored in the central controlling system in advance.

The switching system of the stored program control type is so versatile that different office conditions are met by changing the program, thus leading to the advantage that changes in office conditions or an addition of services necessitated by expansion of complicated telephone network can be effected only by changing the program.

However, the disadvantage of the switching system programmed to a high level is that it is still high in cost compared with the conventional crossbar system or the like. This is partly due to the provision of a large amount of memory to store the status of all the subscribers. A well known switching system of the stored program control type is such that the results of the sequential scanning of the status of all the subscribers are compared with the preceding scanning results for detecting changes in condition. This well known system will be described more in detail below.

1. The status of the subscribers' lines are scanned by a device called a line scanner at regular intervals, say, every 200 ms, and the results of scanning are stored in the central controller.

2. On the other hand, the results of prior scanning are already stored in the memory of the central controlling system as the prior status of the subscribers.

3. The information obtained by 1 above represents the latest results of scanning, while 2 indicates the results of prior scanning. If there is a difference between these two types of information, it shows that a change in status such as call origination has occurred.

In this type of switching system, a comparison of the latest scanning result with the prior scanning result requires provision of memory for storing the status of all the subscribers, with the result that at least as many memory elements as there are subscribers are occupied in the expensive memory for that purpose. The job of identifying the changes in subscribers' status is a great burden on the central controller as such changes are made clear only after making the comparison of the latest scanning result with the prior scanning result, often resulting in delayed processing or the omitting of other jobs. If this shortcoming is to be overcome it is necessary to increase the processing speed of the central controller at the sacrifice of the advantage of low cost.

Accordingly, it is an object of the present invention to provide an economical switching system without losing the versatility of the stored program control system.

Another object of the invention is to reduce the memory of the controlling system by eliminating the need for storing the status of all subscribers.

A further object of the present invention is to provide a switching system for a stored program control type in which the burden on the the central controller is reduced and services are improved instead.

One of the features of the present invention lies in that it comprises a calling line identifier for identifying the position of a calling line on the switching network and a called line busy status detector for detecting the free or busy status of a called line designated by the central controller, so that the information acquired by the two devices above is read and utilized by the central controller.

Another feature of the invention is that the calling line identifier and the called line busy status detector identifies the condition of a line circuit corresponding to each subscriber, which circuit has a function to identify and indicate at least the three conditions of the subscribers' line including free, calling and busy status.

According to still another aspect of the invention, the central controller reads through a scanning device the information acquired by the calling line identifier and the called line busy status detector.

The above and other objects, features and advantages will be made apparent by the detailed description taken in conjunction with the accompanying drawings, in which.

Figure 1:
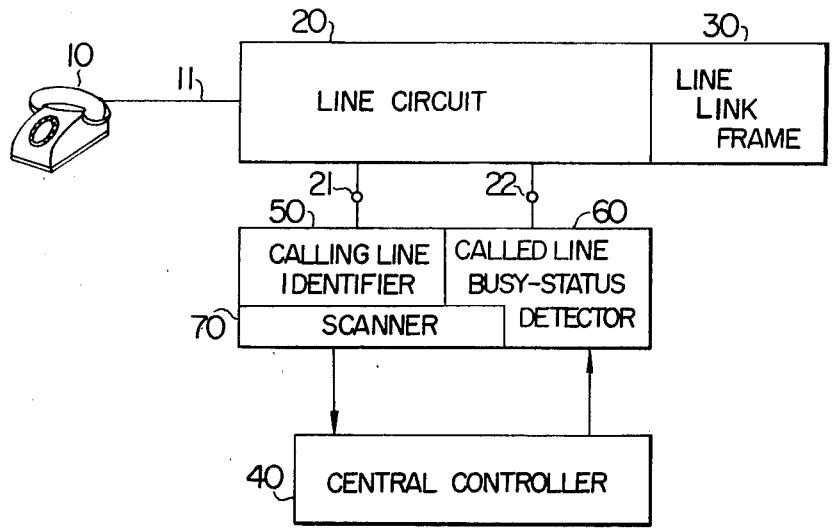
FIG. 1 is a block diagram schematically showing those sections of an embodiment of the present invention which are directly related to the switching system of the stored program control type according to the present invention.

Referring to FIG. 1 showing those sections of the switching system of the stored program control type embodying the present invention which are directly related to the invention, reference numeral 10 shows a subscriber's telephone set, numeral 20 a line circuit connected to the telephone set 10, numeral 30 a line link frame which is a switching network to which the line circuit 20 is connected, numeral 40 a central controller for controlling the switching system, numerals 50 and 60 a calling line identifier and a called line busy status detector according to the present invention respectively which are interposed between the line circuit 20 and the central controller 40, and numeral 70 a scanner also inserted between the line circuit 20 and the central controller 40. Other devices required as parts of the telephone exchange such as a trunk link frame and a wide variety and a great number of trunks included therein will not be described as they are similar to those well known and not directly related to the present invention. Further, the line circuit 20, line link frame 30, and central controller 40 in FIG. 1 are also similar to those included in a well known switching system of the stored program control type and therefore will not be described in detail below except the line circuit 20 which is directly related to the present invention.

Figure 2:
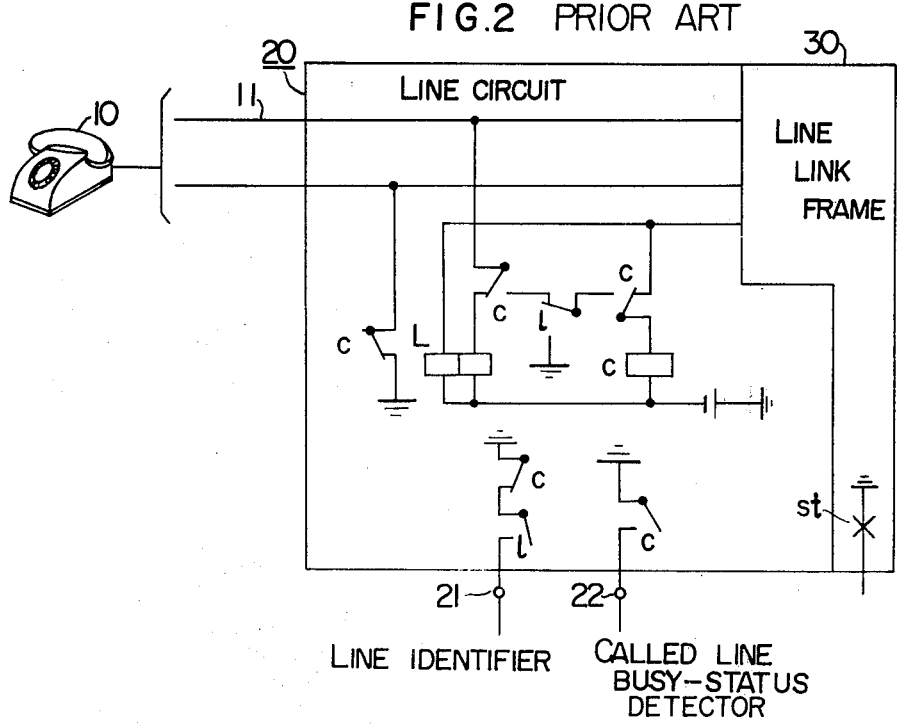
FIG. 2 is a circuit diagram showing the line circuit included in the embodiment shown in FIG. 1.

A subscriber or telephone set 10 is connected through the line 11 to the line circuit 20 shown in FIG. 2. The line circuit 20 comprises a line relay L and a cut-off relay C whose combinations of operation and release produces the following four different status:

| | Line relay L | Cut-off relay C | Line circuit status |
|---|---|---|---|
| 1 | released | released | free |
| 2 | operating | released | calling |
| 3 | operating | operating | busy |
| 4 | released | operating | locked out |

Status 1 is a normal free condition where the handset of the telephone 10 is on hook. Status 2 is a calling condition where the handset of the telephone 10 is off hook and ground potential appears at the calling status indicating terminal 21 of the line circuit 20. Status 3 and status 4 are conditions in which the handset of the telephone 10 is off hook and represent the speech connection and lock-out condition respectively. If the status 3 and status 4 are called busy statuses, the cut off relay C is operating when the line circuit is in busy status, which is indicated by the fact that ground potential appears at the called line busy status indicating terminal 22. The above-mentioned line circuit may be constructed quite the same way as the prior art.

Figure 3:
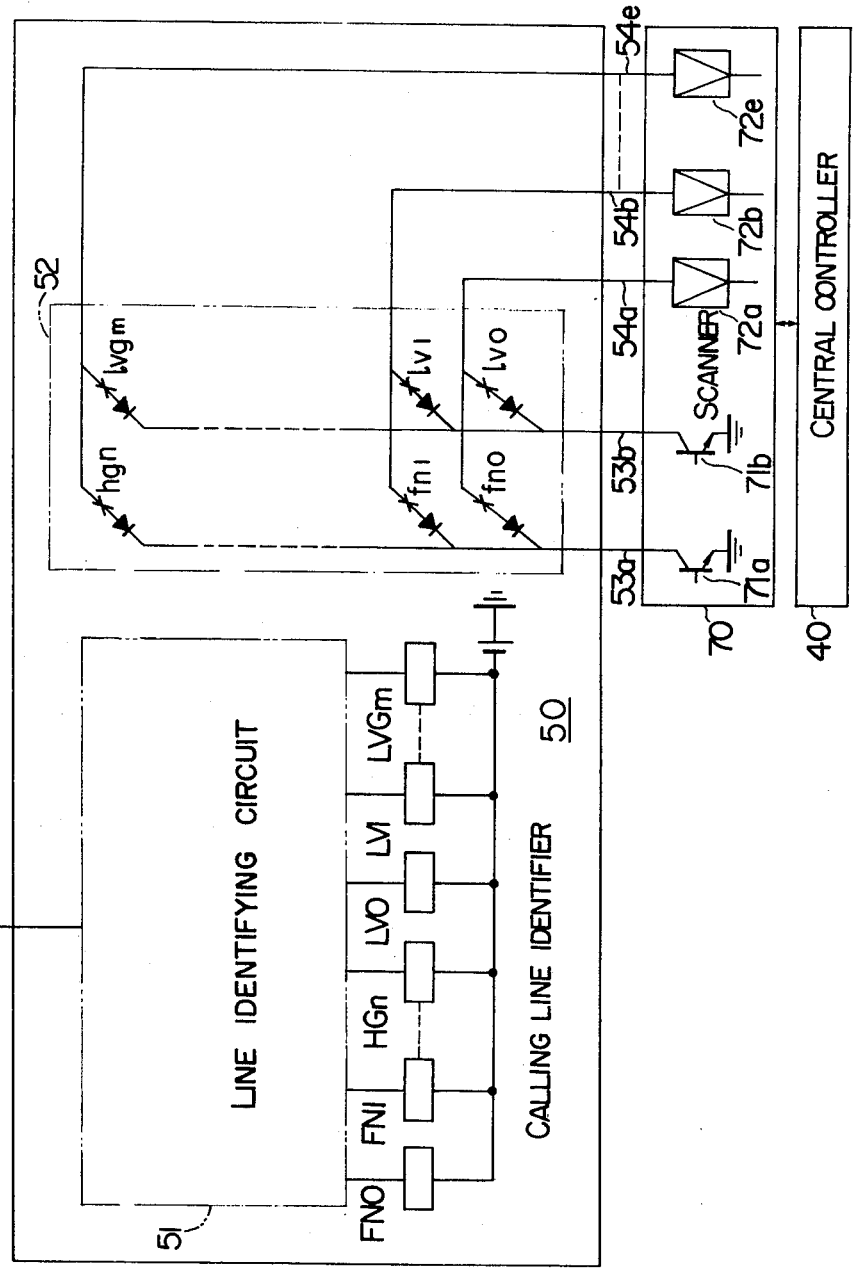
FIG. 3 is a circuit diagram showing the essential parts of the line identifier and the scanner.

The calling status indicating terminal 21 of the line circuit 20 is connected to the calling line identifying circuit 51 of the calling line identifier 50 as shown in FIG. 3. The calling line identifying circuit 51 may consist of the same means as used in the well known crossbar exchange.

In other words, in identifying the position on the line link frame where a calling line is located, the information representing such a position is generally indicated in forms desirable for control purposes such as frame number FN, horizontal group number HG, level number LV, and level group number LVG. In FIG. 3 are shown frame number identifying relays FN0 and FN1, horizontal group number relay HGn, level number relays LV0 and LV1 and level group number relay LVGm. The contacts of these position information relays and diodes make up two rows of matrix 52. The contacts of the frame number and horizontal group number relays are connected to the first row 53a of the contact matrix 52, while the contacts of the relays of the level numbers and level group numbers are connected to the second row 53b, the rows 53a and 53b being connected to the address drivers 71a and 71b of the scanner 70 respectively. The lines 54a to 54e are connected to the sense amplifiers 72a to 72e in the scanner 70 respectively.

Figure 4:
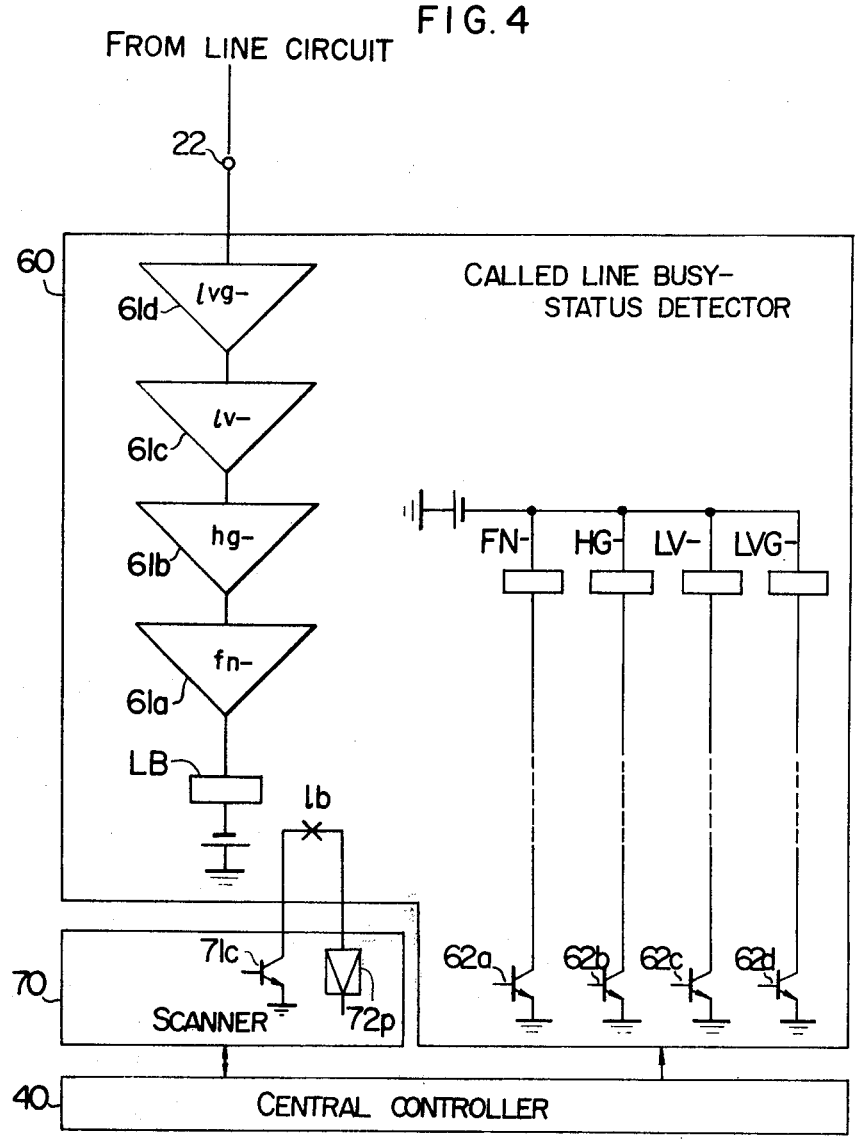
FIG. 4 is a circuit diagram showing the essential parts of the called line busy status detector and the scanner.

The called line busy status indicating terminal 22 of the line circuit 20, on the other hand, is connected to level group number contact tree 61d of the called line busy status detector 60 as shown in FIG. 4. The called line busy status detector 60 also comprises a plurality of the frame number relays, horizontal group number relays, level number relays, and level group number relays, respectively represented by reference symbols FN-, HG-, LV- and LVG- and connected to the relay drivers 62a, 62b, 62c and 62d. The contacts of these number relays make up the contact trees 61a, 61b 61c and 61d respectively stacked in that order upwardly in such a manner that each level group number contact of the contact tree 61d corresponds to each of the line circuits one by one. The frame number contact tree 61a is connected to the battery E through the busy status detecting relay LB. The make contact 1 b of the relay LB is connected to the address driver 71b of the scanner 70 and the sense amplifier 72p.

The operation of this embodiment will be explained below. When the subscriber lifts the handset of the telephone 10 for calling, the line relay L of the line circuit 20 is energized through line 11 and the telephone. As a result, ground potential appears at the terminal 21 and at the same time the line link frame 30 starts the calling line identifier 50. The calling line identifying circuit 51, in the manner similar to a well known one, identifies the position of the calling subscriber 10 on the line link frame 30, that is, the frame number, horizontal group number, level number and level group number. Thus, when the identifying operation has been completed, relays corresponding to the frame number, horizontal group number, level number and level group number remain operated. Under this condition, the scanner 70 causes the address driver 71a to drive the first row 53a of the matrix 52, only those diodes corresponding to the operated fn- and hg- conduct and the result of the conduction is read by the sense amplifiers 72a to 72e. The second row 53b, then, is driven through the address driver 71b, whereupon only those diodes corresponding to the operated lv- and lvg- conduct and the result of the conduction is read by the sense amplifiers 72a to 72e. In this way, the information of the frame number FN-, horizontal group number HG-, level number LV- and level group number LVG- is read by the scanner 70 and transferred to the central controller 40.

It will be understood from the above explanation that a complete set of information on a subscriber is obtained without any other identifying operation such as the comparison of the scanning results like the prior art, thereby eliminating the need of the provision of memories for subscribers.

In establishing the incoming connection to the telephone 10, it is necessary for the central controller 40 to know whether the telephone 19 is occupied or not. Although the central controller 40 according to the present invention is not provided with any memories allotted to subscribers' status, it is able to know the free or busy status of the telephone in the manner mentioned below.

In FIG. 4, the central controller 40 sends the information on the called line, that is, the information on a position on the line link frame to the called line busy status detector 60 by energizing relays corresponding to the relay drivers 62a to 62d. The frame number relays FN-, horizontal group number relays HG-, level number relays LV- and level group number relays LVG-, one for each, are energized, with the result that a circuit in the trees 61a to 61d is closed thereby to form a path, thus establishing a connection between the terminal 22 of the line circuit 20 and the relay LB.

In the event of the called line being busy, ground potential appears at the called line busy status indicating terminal 22 as mentioned above and therefore the relay LB is energized. Thus, the busy status of the called line is identified by the operation of the relay LB. The result of detection by the called line busy status detector 60 is read by the address driver 71c and the sense amplifier 72p and transferred to the central controller 40.

It will be thus seen that by providing the switching system of stored program control type with a calling line identifier and a called line status detector for utilizing the indications of the line status indicating relays shown by L and C in FIG. 2, identification of a calling line and the detection of status of a called line is possible without providing the central controller with any memories corresponding to all subscribers.

As can be seen from above, memories which are required in the conventional switching system of the stored program control type are saved according to the invention. This provides a novel switching system of stored program control type without adversely affecting the versatility of the stored program control.

What we claim is:
1. In a telephone switching system of the stored program control type having
   a plurality of line circuits associated with a plurality of respective subscribers and capable of indicating the free status, the calling status, and the busy status of a subscriber's line;
   a switching network having a plurality of terminal positions to be respectively connected with said line circuits; and
   a stored program central controller;
   the improvement comprising:
      first means, coupled between said line circuits and said stored program controller, and responsive to a first signal from a line circuit, representative of the calling status of a subscriber, for supplying to said central controller an indication of the terminal position of a calling subscriber's line on said switching network; and
      second means, coupled between said stored program controller and said line circuits, and being responsive to a signal from said central controller, corresponding to the terminal position of a called subscriber's line on said switching network and representative of a request for an incoming connection to said called subscriber's line, and a second signal, from the line circuit associated with said called subscriber's line, and representative of the busy status of said called subcirber's line, for supplying to said central controller an indication of the busy status of said called subscriber's line.

2. The improvement according to claim 1, wherein each line circuit comprises a line relay operated in response to an off-hook calling condition of a subscriber's line circuit for causing said first signal to be coupled to said first means.

3. The improvement according to claim 2, wherein each line circuit further comprises a cut-off relay operated in response to the called busy condition of said subscriber's line circuit for causing said second signal to be coupled to said second means.

4. The improvement according to claim 3, wherein each line circuit further comprises calling status indicating means including a make contact of said line relay in series with a break contact of said cut-off relay between a source of reference potential and said first means.

5. The improvement according to claim 4, wherein each line circuit further comprises busy status indicating means including a make contact of said cut-off relay disposed in series between a source of reference potential and said second means.

6. The improvement according to claim 1, wherein said first means comprises
   a line identifying circuit coupled to receive said first signal from a line circuit,
   a diode matrix selectively energized by said line identifying circuit in accordance with outputs thereof representative of the terminal position of said calling subscriber's line on said switching network, and
   a scanner, coupled to said diode-switch matrix, for supplying signals to said central controller corresponding to those diodes of said matrix which have been energized by the outputs of said line identifying circuit.

7. The improvement according to claim 6, wherein said second means comprises
   a plurality of relays, each having a set of associated contacts, coupled to receive a signal from said central controller corresponding to the terminal position of a called subscriber's line on said switching network, said sets of associated contacts being connected in series and coupled to receive said second signal from a line circuit,
   a line busy relay connected in series with the series connected sets of associated contacts and a source of relay activating potential, and
   wherein said scanner is further operated in response to the operation of said line busy relay, for supplying to said central controller said indication of the busy status of said called subscriber's line.

* * * * *